United States Patent [19]

Bourassa

[11] 4,118,226
[45] Oct. 3, 1978

[54] COMBINATION AIR FILTER AND AIR TREATING DEVICE

[76] Inventor: Richard Lawrence Bourassa, 3406 Lisa Cir., Waldorph, Md. 20601

[21] Appl. No.: 780,095

[22] Filed: Mar. 22, 1977

[51] Int. Cl.$^2$ .............................................. B01D 50/00
[52] U.S. Cl. ........................................ 55/279; 55/483; 55/486; 55/DIG. 31; 422/123; 422/306
[58] Field of Search ................. 55/279, 483, 486, 489, 55/502, 511, 515, 527, 528, DIG. 31; 21/74 R

[56] References Cited
U.S. PATENT DOCUMENTS

| | | | |
|---|---|---|---|
| 3,577,710 | 5/1971 | Feldman | 55/279 |
| 3,902,877 | 9/1975 | Swaim | 55/279 |
| 4,028,073 | 6/1977 | Swaim | 55/279 |

Primary Examiner—Frank W. Lutter
Assistant Examiner—David L. Lacey

[57] ABSTRACT

An integral and disposable combination air filter and air freshener or germicidal element for use in a forced air type ventilation heating and cooling system wherein the air freshener or germicidal element is made an integral part of the filter element or support casing therefore in unison and wherein a predetermined depletion rate of the air freshener or germicidal aromatics coincides with the regular replacement intervals of the filter element. The entire unit is readily adaptable to be inserted in or removed from the air circulation system and disposed. The support casing for the filter elements may also have special baffles designed therein to prolong the effectiveness of the aromatics.

7 Claims, 7 Drawing Figures

COMBINATION AIR FILTER AND AIR TREATING DEVICE

BACKGROUND OF THE INVENTION

This invention is related to the art of air freshening air filters adapted to be used in forced air type heating and cooling systems. Particularily, what is disclosed and described herein is an integral disposable combination air filter and air freshening element to be used in a mechanical forced air type ventilation system.

Because of the increased use in forced air heating and cooling systems in residential and commercial establishments, and because these establishments are not supplied with a continuous supply of fresh air from outdoors, or if so, because the air outside of such establishments may be contaminated with undesirable particulate matter or odors, there is an increased need or desire to maintain the more pleasant environment in locations of human habitation. Moreover, the inpracticalities of open cycle ventilating systems wherein the forced air is not recirculated within a closed system during winter or summer months due to heating and cooling considerations have further increased the need or desire to freshen or disinfect the air of a closed cycle ventilating system. Not only do outside air temperature and air quality factors prevent open cycle ventilation for fresh air, but other factors, such as cooking, dust accummulation, and certain other unpleasant household and industrial chemicals has increased the desire for air filtering and freshening devices.

Additionally, with the recognition of deleterious environmental effects caused by aerosol air fresheners and germicides, other means of accomplishing air "conditioning" have been sought. In this regard, solid or liquid aromatic air fresheners and germicides have penetrated the market as an alternative, however, their effectiveness in freshening or sterilizing is minimal, as the disbursement of the aromatics are somewhat restricted, depending upon the air circulation in close proximity thereto. Incense has also been utilized to obviate the use of aerosols, but undesirable fire and smoke pollution hazards accompany their use.

It has long been recognized that air freshening and disinfecting can be accomplished by the incorporation or air freshener or air disinfecting elements within an air filter. In this respect, the applicant has noted U.S. Pat. No. 3,902,877 issued to Swaim on Sept. 2, 1975 wherein a container for air treating agents is disclosed. Means are provided for the disposition of a container filled with an air treating substance embedded within the filter elements. The container may be filled with a substance of the user's choice and be refilled for additional use with the same or a replacement air filter.

The applicant has also noted U.S. Pat. No. 3,820,308 issued to Onuki on June 28, 1974 wherein a sterilizing air filter is disclosed having a sterilizing agent coated directly on the filter elements. Unlike the Swaim patent, the entire filter element is disposable.

There are certain drawbacks with the prior art concerned with combination air filter and air freshening filters in that they may be relatively expensive or inefficient for reasons to be heretofore discussed. It is, of course, convenient and desirable to utilize disposable air filter units inasmuch as the maintenance effort is substantially reduced or eliminated. Although a non-disposable type may provide freedom of choice in the type of air freshener or disinfectant, this advantage may be gained in a disposable type by the provision of a variety of air filters having different type air fresheners or disinfectants.

Additionally, other types of combination air filters and air freshener or disinfecting agents wherein the air freshener or disinfecting substance is disposed directly on the filter elements have another significant drawback. That is, since the purpose of the air filtering elements is to trap particulate matter on the filtering fibers, there is a tendancy towards reduced odorizing or disinfecting efficiency with time due to a continuous reduction of exposed fiber surface area as the particulate matter within the filter increases. The odorizing or disinfecting effect of the container filled with a air freshener substance may also be reduced due to dust clogging or coating.

Thus far, the prior art has not revealed the most efficient means for accomplishing the dual function of air filtering and air freshening and/or disinfecting.

The prior art also discloses several means of producing such dual function air filters. The most common, as disclosed by the Swaim patent, is the provision of a separate ordoring element within or about the filter element. Treatment of the filter elements is also disclosed. These methods have not proved to be the most economical and efficient.

SUMMARY OF THE INVENTION

In view of the foregoing, it is an object of this invention to provide a conveniently disposable integrated air filter having incorporated therein, an air freshening and/or disinfecting agent.

It is another object of the invention to disclose a process of economically producing an integral air filter and air freshening or germicidal element.

An additional object of the invention is to provide an economical means of producing the dual function air filters.

Yet another object of the invention is to produce a dual function air filter wherein the aromatic effects of the filter expires at regular replacement intervals of the filter, thereby reducing the maintenance effort for the air freshening or disinfecting task.

Other objects of the invention will become readily apparent upon review of the foregoing disclosure.

Specifically, this invention is related to a fiber type air filter consisting of textile material or other woven fibers that arrest particles in the interstices until they are clogged. The features of the invention include the provision of an air freshening and/or disinfecting element associated with the air filter elements or support casing therefore in integrated form wherein the entire combination thereof is adapted to be periodically replaced and disposed.

The air freshener or disinfecting agent may consist of a solid medium having contained therein a high concentration of aromatic to be continuously released or discharged into the surrounding environment. In one embodiment of the invention, this solid medium is disposed on the respective edges of the air filtering elements for the purpose of reduced air flow restriction and reduced dust combination. The filtering and aromatic medium is enclosed in a case having perforations therein for unrestricted air flow therethrough. The external casing for the filtering and the aromatic medium may also include baffles in the nature of a curved surface on the edges of the surface portions for the purpose of redirecting the flow of air through the filter away from the aromatic element. What is accomplished by this feature is reduced dust contamination and reduced rate of depletion of the aromatic elements. Because of the high concentration of disinfecting or odorizing agents within the solid medium, a constant flow of aromatic will egress from the substance until the concentrations therein equals the ambient concentration of aromatics. The ambient concentrations will be reduced as masses of air flows through the filtering element thereby permitting additional aromatic to eminate from the solid medium. This action will continue until a point in time is reached wherein the rate of depletion of aromatics is insufficient to accomplish the intended objective of air freshening or disinfecting, at which point the filter should be discarded. The quantity of aromatic to be placed within the air filter element should permit its effects to last the duration of the interval of filter changes, usually between 1 and 3 months.

The invention may be practiced either with or without the perforal edge design of the surface portions of the filter, although more efficient utilization of the aromatic element is achieved with the specially designed surface edge for redirecting the flow of air. Other means of redirecting air flow may be implemented, and consequently, it is not the intent of the applicant to limit the scope of the invention to precisely what is shown herein.

In another embodiment of the invention, the odorizing and/or disinfecting element composes the support casing itself, that is, the support casing for the filter elements consist of an absorbent material which has been previously saturated with one of the respective aromatics. For instance, a rigid foam rubber or other absorbent synthetic material previously saturated with aromatics may serve as the support casing for the filter elements. In this instance, aromatics are continuously discharged into the ambient environment to produce an air freshening or disinfecting effort when placed in a mechanical ventilation system.

Separate odoring or disinfecting elements, but integral with the filter elements or support casing therefore, may also be employed to accomplish the spirit of the invention. The elements may take any size, design, or shape. It is only necessary that a unitary structure be maintained so that the filter and the aromatic element be utilized and discarded, concurrently.

DETAILED DESCRIPTION OF THE DRAWINGS

Now, referring to the drawings which more particularily points out and defines the invention:

Figure 2:
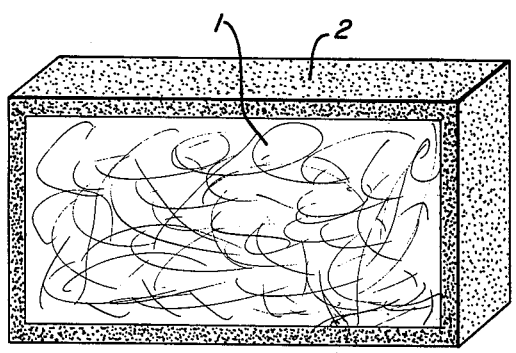
FIG. 2 illustrates the combination air filter element and odorizing or disinfecting element in integral contact therewith.
Figure 3:

FIG. 3 discloses a side view of FIG. 2.

Figure 4:
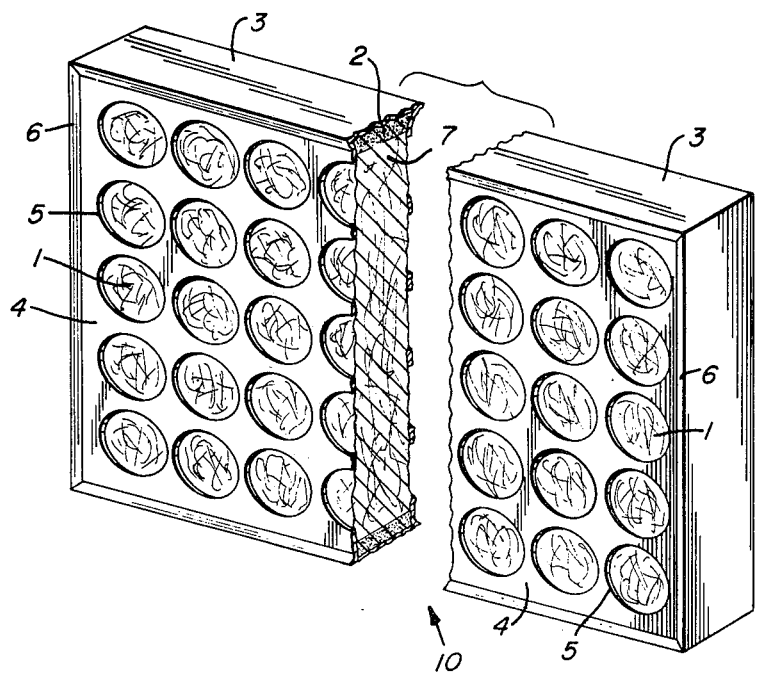

FIG. 4 shows a perspective view of the air filter elements, the odorizing or disinfecting element, and the external casing having baffles on the edges of the surface portion of the external casing for redirecting the flow of air.

Figure 5:
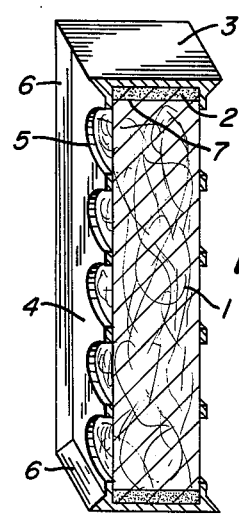

FIG. 5 shows a cut away perspective view of the assembled filter and odorizing element of FIG. 4.

Figure 6:
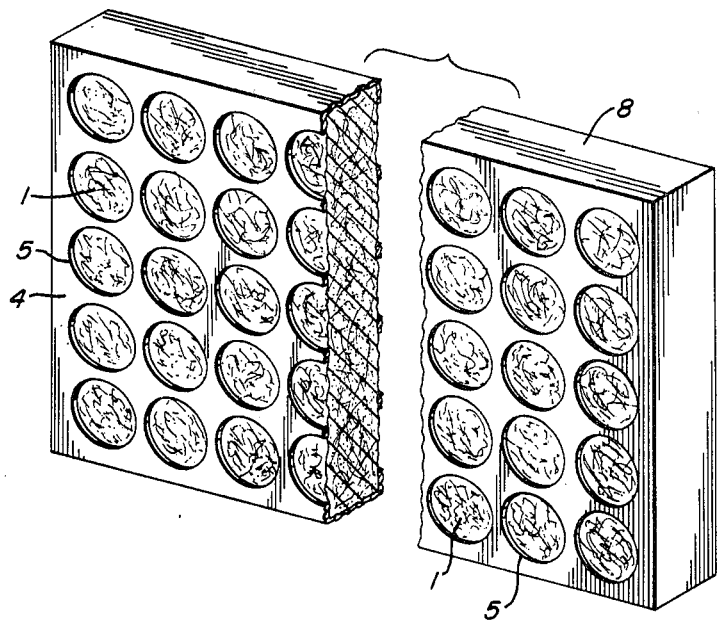

FIG. 6 shows another embodiment of the invention wherein the support casing consists of a rigid absorbent material containing concentrated aromatics or germicides.

Figure 7:
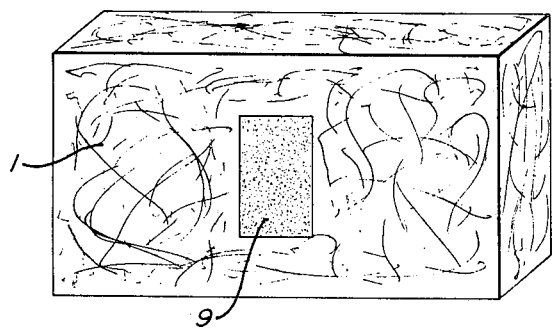

FIG. 7 illustrates an odorizing or disinfecting element integrated with the filtering element.

DETAILED DESCRIPTION OF THE INVENTION

Figure 1:
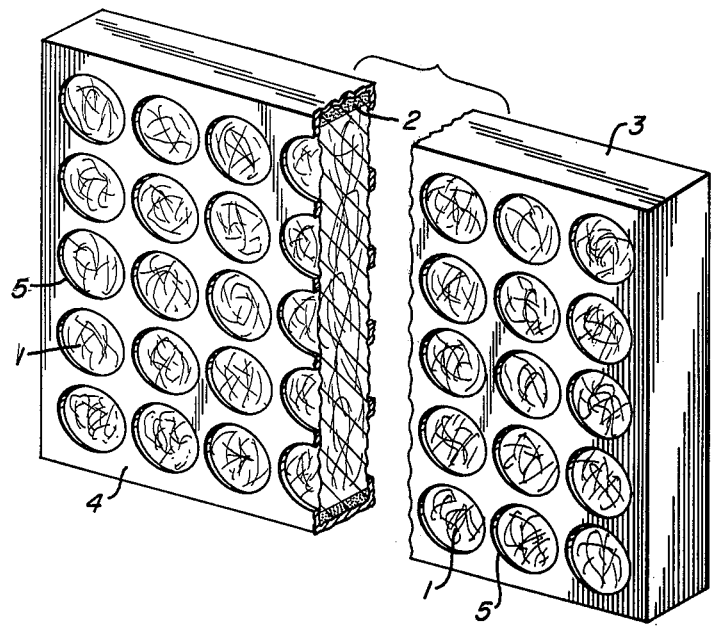
FIG. 1 shows a perspective view of the air filter element, disinfecting or odorizing element, and external casing in its assembled relationship.

FIG. 1 discloses a perspective view of one embodiment of the invention wherein the filtering element 1 is shown to be encapsulated by external casing 3 which is composed of an inexpensive disposable material. On the surface portion 4 of the filter element 1, there are perforations 5 on both the front and rear sides of the casing to allow unrestricted air flow through the filtering element 1. Enclosed within casing 3, and disposed on or about the perforal edges of filter element 1, a relatively thin layer 2 of a highly concentrated medium of air freshening and/or disinfecting material is placed in integral contact with the filtering element 1.

FIG. 2 discloses in greater detail the association between the filter element 1 and the layer of the aromatic or disinfecting medium 2. The external casing for support of the filtering element and aromatic medium is not shown. It is the purpose of FIG. 2 to illustrate the circum ambient nature of the odorizing and/or disinfecting medium around the edges of the filtering element 1. A cut away side view of the filtering element and aromatic medium is shown by FIG. 3. The principle design of the combination filter element and aromatic medium is shown by FIG. 3. The principle design of the combination filter element and aromatic medium disclosed by FIG. 1 is sufficient to carry out the spirit of this invention. As previously stated, the aromatic medium is functionally disposed on the perforal edges of filter element 1 primarily for the purpose of preventing particulate contamination of the surfaces of the aromatic medium 2. Also, by not employing odorizing or germicidal agents directly upon the filter element 1, the unrestriction of air flow through the filter element 1 is further enhanced, and the odorizing or disinfecting effects of the substance is not diminished by a clogged filter.

To further enhance the functional design of the combination air filter and air freshening agent, FIG. 4 is disclosed showing a special baffle design 6 on the perforal edges of air filter 10. The aromatic element 2 is shown to have only one surface thereof exposed to the filter element 1 and is not subjected to the direct impingement of air flowing through the filter elements. It is the purpose of baffles 6 to redirect the traverse flow of air inwardly and away from the aromatic element 2 primarily for the purpose of reducing dust contamination of the surfaces 7 of the aromatic element. FIG. 5 discloses, in greater detail, the specific shape of baffles 6 within the combination air filter and air freshener unit. Baffles 6 may possess any shape which may redirect the flow of air. They are shown to be curved in FIGS. 4 and 5, but they may be slanted or other means may be adapted entirely different from that which is shown to accomplish the intended purpose.

Now, referring to FIG. 6, one embodiment is shown wherein support casing 8 consists of a rigid absorbent material which has been previously treated by immersing casing 8 prior to assembly with filter element 1 in a solution of concentrated aromatics or volatile germicides. The concentration of aromatics or germicide may vary according to the desired duration of use of the filter in the ventilation system. It should be noted the only case 8, and not filter element 1, are to be treated, thereby preventing degradation of filtering qualities. Subsequent to treatment of case 8, the entire filter unit is assembled and hermetically sealed until use.

FIG. 7 is intended to illustrate another mode of aromatic or germicidal element 9 disposition. As previously stated, the element may be integrated with the support casing while keeping in line with the spirit of the invention specifically, element 9 is composed of a thin layer of a highly concentrated medium of air freshening and/or disinfecting material which is in integral contact with filtering element 1.

Inasmuch as the regular changing intervals of air filters may vary according to the manner of use and the conditions under which they are used, for each embodiment of the invention herein disclosed, the quantity of aromatics or germicides to be absorbed in the respective elements or casing may be varied so that the time lapse from initial use in the ventilation system equals the regular changing interval of the filter. In this manner, efficient use of the aromatics and germicides is achieved and the maintenance effort for maintaining fresh and clean air is minimal.

The applicant hereby notes that the novel aspects of this invention is the provision of an integral air filter and deodorizing or disinfecting agent contained within a single unit, the entire unit thereof being readily adaptable for replacement and disposal. Special consideration is given to container design wherein baffles are provided on the edges of the surface portions thereof to redirect the flow of air away from the odorizing or disinfecting agent. The purpose thereof is to prevent dust contamination of the odorizing or disinfecting agent by reducing the probability of surface contamination thereby restricting the emination of aromatic into the filter element. Additionally, special attention should be given to the integration of the air fresheners or germicides with the support casing and the air filtering elements.

From the foregoing, it will be appreciated that the maintenance effort for an air filter having an air freshener agent is substantially reduced and that more effective utilization of air freshener odorizing agents may be emplimented by special baffle designs. Likewise, it can be similarly appreciated that the filtering capacity of the air filter itself is not reduced inasmuch as the filter fiber elements do not have coated thereon any foreign substance or disinfecting or air freshening. Consequently, full filtering effect may be achieved, while at the same time, the provision of air freshening or disinfecting is also accomplished.

It can be appreciated that many changes and modifications of the invention as described herein may be made conveniently by a person skilled in the art to which this subject matter pertains without substantially deviating from the spirit and scope of the invention. Consequently, it is not the intention of the applicant to limit his invention to those modes and embodiments of the invention described, shown or claimed herein, but to include those modifications, adaptations, or changes which may be so made.

Now, therefore, a complete description of the invention having been made, what is claimed is:

1. An integral disposable combination air filter and air freshener device for a forced air ventilation system comprising; a filtering element having opposed surfaces, opposed top and bottom edges, and opposed side edges; at least one of said opposed edges having in integral contact therewith a solid medium of concentrated air freshening aromatics and being adapted to slowly discharge into the ventilation system air freshener aromatics; and disposable container means enclosing said filtering element and solid medium having respective and corresponding surface portions, top and bottom portions, and side portions, said container means having perforations therein for allowing unrestricted air flow through the air filtering element.

2. The combination of claim 1 wherein the respective peripheral edges of the surface portions of the disposable container means comprises means adapted to redirect the traversed flow of air away from the solid medium of concentrated air freshener aromatics to reduce the depletion rate of the aromatics and to prevent dust contamination of the solid medium.

3. The combination of claim 2 wherein the solid medium includes germicidal aromatics.

4. The combination of claim 1 wherein the solid medium includes germicidal aromatics.

5. An integral disposable combination air filter and air freshener unit for a forced air circulation system comprising an filtering element having opposed surfaces, opposed top and bottom edges, and opposed side edges, and a support casing composed of a rigid absorbent material for supporting the said filter elements wherein the support casing lies in intimate contact with the said respective side edges and top and bottom edges, and in intimate contact with at least one of said opposed surfaces, said support casing having absorbed therein a predetermined quantity of concentrated air freshener aromatics and being adapted to discharge the said aromatics into the ambient environment.

6. The combination of claim 5 wherein the support casing has absorbed therein a volatile germicide for disinfecting the ambient environment.

7. The combination of claim 5 wherein the support casing has absorbed therein an air freshener aromatic and volatile germicides adapted to be discharged into the ambient environment.

* * * * *